INVENTORS
COLIN ELLIOTT MARKS
JOHN MILLER

United States Patent Office 3,728,281
Patented Apr. 17, 1973

3,728,281
CORROSION INHIBITING COMPOSITION CONTAINING HYDRAZINE AND A PYRAZOLIDONE OR AN AMINOPHENOL
Colin Elliott Marks, Quorn, and John Miller, Mapperley, England, assignors to Fisons Limited, Suffolk, England
Filed Mar. 31, 1971, Ser. No. 129,690
Claims priority, application Great Britain, Apr. 2, 1970, 15,570/70; May 13, 1970, 23,047/70
Int. Cl. C23f 11/14, 11/18
U.S. Cl. 252—392
18 Claims

ABSTRACT OF THE DISCLOSURE

An aqueous composition for inhibiting corrosion in systems containing hot water comprises hydrazine and at least one activating compound which may be a pyrazolidone or an aminophenol.

---

Figure 1:
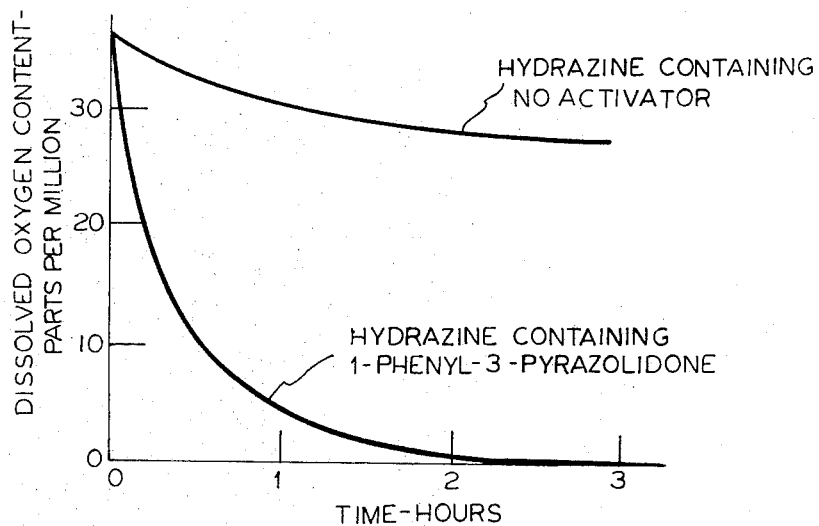

The present invention relates to a composition and method for inhibiting corrosion in apparatus containing aqueous media.

Dissolved oxygen has long been recognised as a serious cause of corrosion in steam raising equipment and its removal from the feed-water is desirable for efficient and economical operation of the plant. Hydrazine has been used for the removal of the dissolved oxygen, but at low temperatures the reaction between the oxygen and hydrazine is slow. It has now been found that in many instances the rate of reaction between the oxygen and hydrazine may be increased by the presence of certain pyrazolidone or aminophenol compounds.

Accordingly, in one embodiment the present invention provides an aqueous composition for inhibiting corrosion containing hydrazine and at least one activating compound selected from compounds having the General Formulae I and II:

(I)
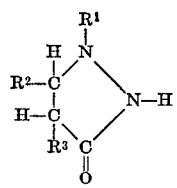

and acid addition salts thereof, wherein $R^1$, $R^2$ and $R^3$ may be different, and are selected from hydrogen and alkyl, aryl and alkaryl groups; all of which groups may be substituted; and (II)
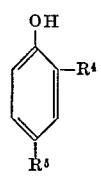

and acid addition salts thereof, wherein one of $R^4$ and $R^5$ is the group —$NHR^6$ in which $R^6$ is selected from hydrogen and alkyl, aryl and aralkyl groups; and the other of $R^4$ and $R^5$ is selected from hydrogen and a group —$NR^7R^8$ in which $R^7$ and $R^8$ may be different and are selected from hydrogen and alkyl, aryl and aralkyl groups.

In one preferred embodiment, the aqueous composition comprises hydrazine and a compound of Formula I or an acid addition salt thereof, wherein $R^1$, $R^2$ and $R^3$ may be the same or different and are hydrogen, alkyl of 1 to 6 carbon atoms, phenyl, naphthyl, benzyl, phenethyl or tolyl. Suitable substituents for the hydrocarbon groups include one or more hydroxy, alkoxy (such as methoxy or ethoxy), hydroxyalkyl (such as hydroxymethyl), amino, substituted amino (such as mono- or di-alkyl substituted amino), nitro, halogen (such as chlorine or bromine), or sulphonic or carboxylic acid groups or salts, esters or amides thereof. Examples of acid addition salts of the compounds of Formula I are sulphates and hydrochlorides. The most preferred compound of Formula I is 1-phenyl-3-pyrazolidone, which is commercially available as Phenidone.

In a further embodiment, the aqueous composition comprises hydrazine and a compound of Formula II or an acid addition salt thereof, wherein one of $R^4$ and $R^5$ is the group —$NHR^6$ in which $R^6$ is hydrogen, alkyl of 1 to 6 carbon atoms (such as methyl, ethyl, propyl or butyl), phenyl or benzyl, and wherein the other of $R^4$ and $R^5$ is hydrogen or a group —$NR^7R^8$ in which $R^7$ and $R^8$ may be the same or different and are hydrogen, alkyl of 1 to 6 carbon atoms (such as methyl, ethyl, propyl or butyl), phenyl or benzyl. Examples of acid addition salts are sulphates or hydrochlorides. The most preferred compounds of Formula II are p-aminophenols, such as p-aminophenol and p-(methylamino) phenol, and their acid addition salts.

The compounds of Formulae I and II are commercially available or can be made by conventional procedures.

The action of the activating compounds of Formulae I and II appears to be catalytic and, consequently, the proportion of hydrazine to the activating compound does not appear to be critical. In general, a weight ratio of hydrazine to activating compound of 30 to 1500:1 has been found satisfactory, a ratio of 50 to 500:1 being preferred.

The concentration of hydrazine in the aqueous solution may be as desired. However, hydrazine is normally supplied as the aqueous solution having a concentration of about 15% or about 35% w./w. for treating boiler water, and it is convenient to add the activator to such an aqueous solution to give the activated hydrazine solution. A suitable activated hydrazine solution therefore contains about 15% w./w. hydrazine and 0.1–0.3% w./w. activating compound in aqueous solution.

More than one of the activating compounds may be used if so desired, but this is not generally necessary.

In a further embodiment, the present invention provides a process for inhibiting corrosion in apparatus containing an aqueous medium, which process comprises adding to the aqueous medium hydrazine and at least one activating compound selected from compounds having the General Formulae I and II:

(I)
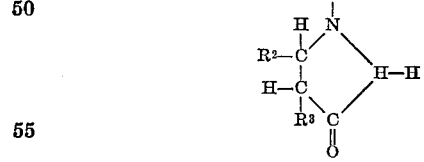

and acid addition salts thereof, wherein $R^1$, $R^2$ and $R^3$ may be different, and are selected from hydrogen and alkyl, aryl, aralkyl and alkaryl groups; all of which groups may be substituted;

(II)
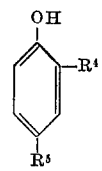

and acid additions salts thereof, wherein one of $R^4$ and $R^5$ is the group —$NHR^6$ in which $R^6$ is selected from hydrogen and alkyl, aryl and aralkyl groups; and the other of $R^4$ and $R^5$ is selected from hydrogen and a group —NR⁷R³ in which R⁷ and R⁸ may be different and are selected from hydrogen and alkyl, aryl and aralkyl groups.

The apparatus may be a power station, marine boiler, industrial plant, hot water system or the like.

Preferred activating compounds are those described above.

The hydrazine and the activating compound may be added to the aqueous medium separately or together, but are preferably added as the aqueous composition of the type described above, and the ratio of hydrazine to activating compound being as described above. It is preferred that a stoichiometric excess of hydrazine over the dissolved oxygen in the water is added to the water, the excess suitably being from 50 to 500% preferably from 100 to 300%, by weight over the stoichiometric requirement.

To promote the effect of the hydrazine, the pH of the aqueous medium is preferably adjusted to 8.5 to 11, preferably 9 to 10.5. The pH may be adjusted by adding a base such as hydrazine itself, sodium hydroxide, ammonia, cyclohexylamine, morpholine, monoethylamine, diethylamine, triethylamine, or any other suitable base.

The following examples are given to illustrate the invention, all parts and percentages being by weight.

EXAMPLE 1

An activated hydrazine solution comprising an aqueous solution containing 15% hydrazine and 0.1% 1-phenyl-3-pyrazolidone was added to water containing 35 p.p.m. (parts per million) dissolved oxygen to give an initial hydrazine concentration of 150 p.p.m. The pH of the water was adjusted to 10.5 with aqueous sodium hydroxide.

The drop in dissolved oxygen content was measured at 25° C. as a function of time and compared with an identical sample containing hydrazine but no pyrazolidone. The results are shown in the graph in FIG. 1 of the accompanying drawings.

EXAMPLE 2

An activated hydrazine solution comprising an aqueousous solution containing 15% hydrazine and 0.3% p-methylaminophenol sulphate, was added to water containing 1.0 p.p.m. (parts per million) dissolved oxygen to give an initial hydrazine concentration of 3.0 p.p.m. The pH of the water was adjusted to 9.5 with dilute aqueous sodium hydroxide.

Figure 2:
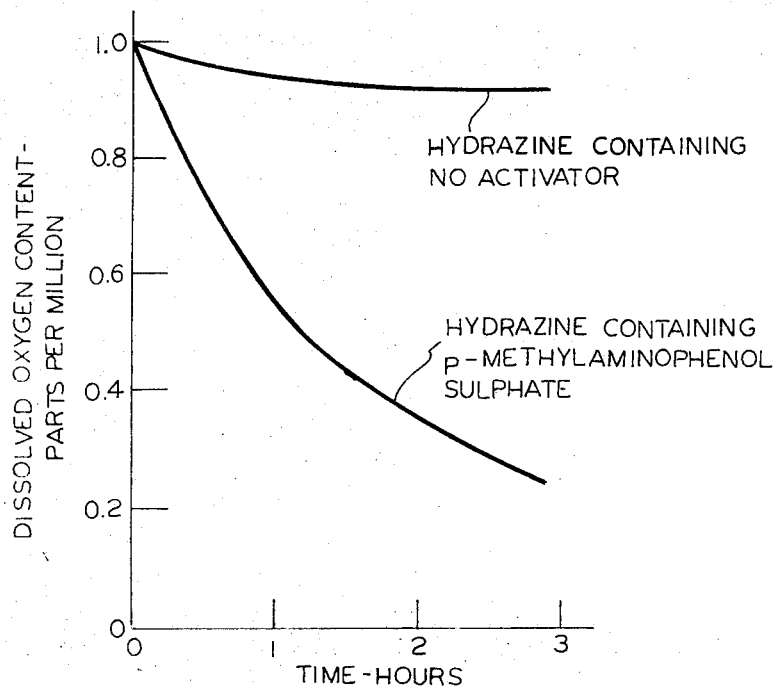

The drop is dissolved oxygen content of the water was measured at 25° C. as a function of time and compared with an identically treated sample using hydrazine without the activator. The results are shown in the graph FIG. 2 of the accompanying drawings.

EXAMPLE 3

An activated hydrazine solution comprising an aqueous solution of 15% hydrazine and 0.3% p-aminophenol was added to water containing 1.0 p.p.m. dissolved oxygen to give an initial hydrazine concentration of 3.0 p.p.m. The pH of the water was adjusted to 9.5 with aqueous ammonia.

Figure 3:
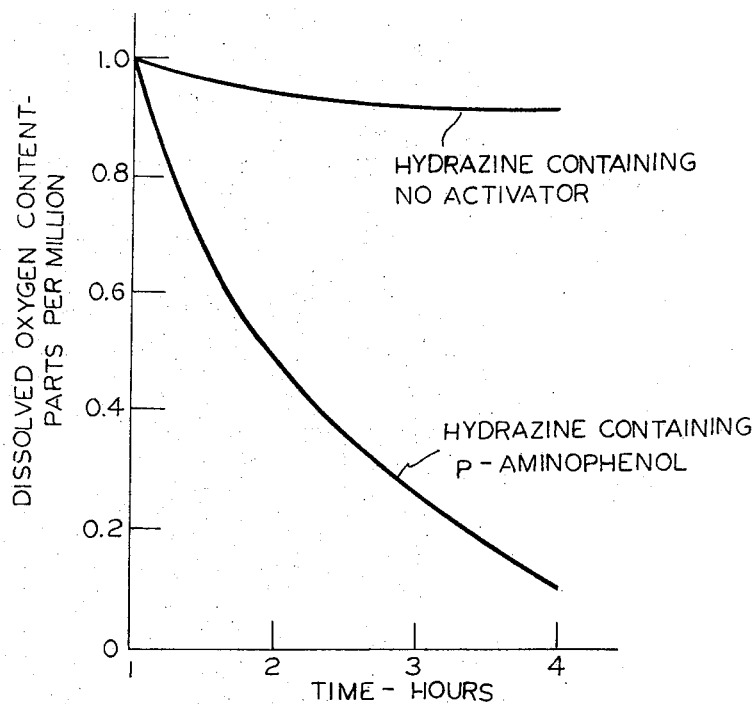

The drop in dissolved oxygen content of the water was measured at 25° C. as a function of time, and compared with an identically treated sample using hydrazine without the activator. The results are shown in the graph of FIG. 3 of the accompanying drawings.

EXAMPLE 4

An activated hydrazine solution comprising an aqueous solution of 15% hydrazine and 0.3% 2,4-diaminophenol was added to water containing 1.0 p.p.m. oxygen to give an initial hydrazine concentration of 3.0 p.p.m. The pH of the water was adjusted to 10.0 with aqueous ammonia.

Figure 4:
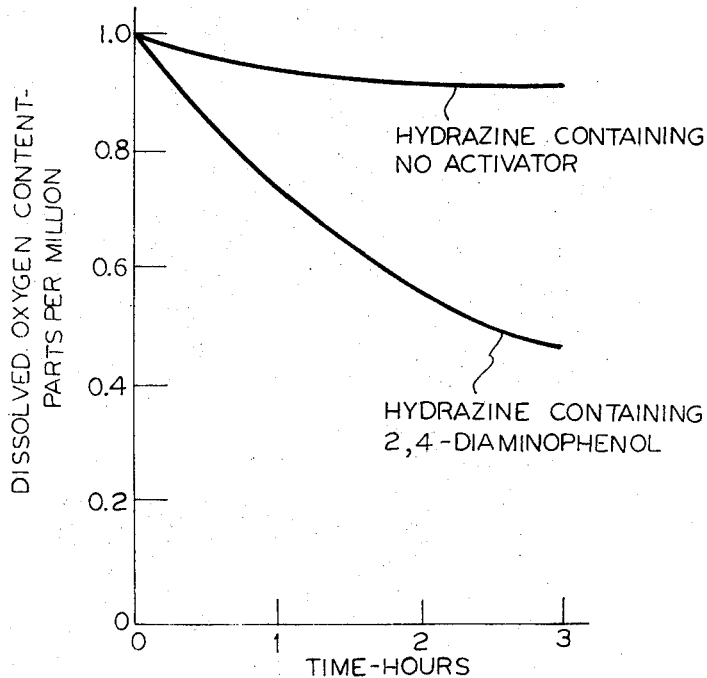

The drop in dissolved oxygen content of the water was measured at 25° C. as a function of time, and compared with an identically treated sample using hydrazine without the activator. The results are shown in the graph of FIG. 4 of the accompanying drawings.

We claim:

1. An aqueous corrosion-inhibiting composition consisting essentially of water, hydrazine and at least one activating compound selected from the compounds having one of the Formula I and II:

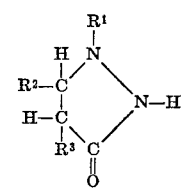

(I)

and inorganic acid addition salts thereof, wherein $R^1$, $R^2$ and $R^3$ are the same or different and each is hydrogen, alkyl of 1–6 carbon atoms, phenyl, naphthyl, benzyl, phenethyl or tolyl, all of said hydrocarbon groups optionally being substituted by one or more of hydroxy, lower alkoxy, hydroxyloweralkyl, amino, nitro, halogen, sulphonic or carboxylic acid or acid amide groups, and

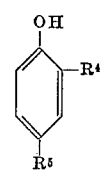

(II)

and inorganic acid addition salts thereof, wherein one of $R^4$ and $R^5$ is —$NHR^6$ in which $R^6$ is hydrogen, alkyl of 1–6 carbon atoms, phenyl or benzyl and wherein the other of $R^4$ and $R^5$ is hydrogen or —$NR^7R^8$ in which $R^7$ and $R^8$ are the same or different and each is selected from hydrogen, alkyl of 1–6 carbon atoms, phenyl or benzyl, the ratio of hydrazine to activating compound being 30:1 to 1500:1.

2. An aqueous composition according to claim 1 wherein the activating compound is selected from compounds of Formula I and inorganic acid addition salts thereof.

3. An aqueous composition according to claim 2 wherein the acid addition salt of the compound of Formula I is a sulphate or a hydrochloride.

4. An aqueous composition according to claim 1 wherein the activating compound is 1-phenyl - 3 - pyrazolidone.

5. An aqueous composition according to claim 1 wherein the activating compound is selected from compounds of General Formula II and inorganic acid addition salts thereof.

6. An aqueous composition according to claim 5 wherein the acid addition salt of the compound of Formula II is a sulphate or a hydrochloride.

7. An aqueous composition according to claim 1 wherein the activating compound is a p-aminophenol.

8. An aqueous composition according to claim 1 wherein the activating compound is p-aminophenol.

9. An aqueous composition according to claim 1 wherein the activating compound is p-(methylamino) phenol.

10. An aqueous composition according to claim 1 wherein the concentration of hydrazine is about 15% or about 35% by weight.

11. A process for inhibiting corrosion in apparatus containing an aqueous medium, which comprises adding to the aqueous medium hydrazine and at least one activating compound selected from the compounds having one of the Formula I and II:

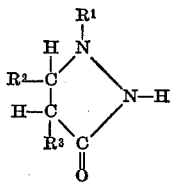
(I)

and inorganic acid addition salts thereof, wherein $R^1$, $R^2$ and $R^3$ are the same or different and each is hydrogen, alkyl or 1-6 carbon atoms, phenyl, naphthyl, benzyl, phenethyl or tolyl, all of said hydrocarbon groups being optionally substituted by one or more of hydroxy, lower alkoxy, hydroxyloweralkyl, amino, nitro, halogen, sulphonic or carboxylic acid or acid amide groups, and

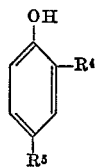
(II)

and inorganic acid addition salts thereof, wherein one of $R^4$ and $R^5$ is $-NHR^6$ in which $R^6$ is hydrogen, alkyl of 1-6 carbon atoms, phenyl or benzyl and wherein the other of $R^4$ and $R^5$ is hydrogen or $-NR^7R^8$ in which $R^7$ and $R^8$ are the same or different and each is selected from hydrogen, alkyl of 1-6 carbon atoms, phenyl or benzyl, the ratio of hydrazine to activating compound being 30:1 to 1500:1.

12. A process according to claim 11 wherein the activating compound is 1-phenyl-2-pyrazolidone.

13. A process according to claim 11 wherein the activating compound is a p-aminophenol.

14. A process according to claim 11 wherein the activating compound is p-aminophenol.

15. A process according to claim 11 wherein the activating compound is p-(methylamino)phenol.

16. A process according to claim 11 wherein the amount of hydrazine added to the aqueous medium is in stoichiometric excess over the amount of oxygen dissolved in the aqueous medium.

17. A process according to claim 16 wherein the amount of hydrazine added to the aqueous medium is 50–500% by weight in excess of the stoichiometric requirement.

18. A process according to claim 11 wherein the pH of the aqueous medium is 8.5 to 11.

References Cited
UNITED STATES PATENTS 3,413,237 11/1968 Foroulis _____ 252—392
3,551,349 12/1970 Kallfass _____ 252—392

FOREIGN PATENTS 1,222,444 8/1966 Germany _____ 252—392
1,511,056 12/1967 France _____ 252—392

LEON D. ROSDOL, Primary Examiner

I. GLUCK, Assistant Examiner

U.S. Cl. X.R.

21—2.7 R; 106—14; 252—181, 188, 390, 393; 260—250 A, 575